United States Patent
Khan et al.

(10) Patent No.: US 8,884,961 B2
(45) Date of Patent: Nov. 11, 2014

(54) SYSTEMS AND METHODS FOR DISPLAYING A UNIFIED REPRESENTATION OF PERFORMANCE RELATED DATA

(75) Inventors: Azam Khan, Aurora (CA); Ebenezer Hailemariam, Toronto (CA); Michael Glueck, Toronto (CA); Ramtin Attar, Toronto (CA); Alexander Tessier, Toronto (CA)

(73) Assignee: AUTODESK, Inc., San Rafael, CA (US)

( * ) Notice: Subject to any disclaimer, the term of this patent is extended or adjusted under 35 U.S.C. 154(b) by 214 days.

(21) Appl. No.: 13/068,709

(22) Filed: May 17, 2011

(65) Prior Publication Data

US 2012/0296609 A1    Nov. 22, 2012

(51) Int. Cl.
  *G06T 15/50*   (2011.01)
  *G06T 19/00*   (2011.01)

(52) U.S. Cl.
  CPC ............. *G06T 19/00* (2013.01); *G06T 2210/04* (2013.01)
  USPC ........................................................ 345/426

(58) Field of Classification Search
  CPC ............................ G06T 2210/04; G06T 19/00
  USPC ........................................................ 345/426
  See application file for complete search history.

(56) References Cited

U.S. PATENT DOCUMENTS

| 2003/0098862 A1 | 5/2003 | Hunt |
| 2008/0062167 A1* | 3/2008 | Boggs et al. ................... 345/419 |
| 2008/0249756 A1* | 10/2008 | Chaisuparasmikul .......... 703/13 |
| 2010/0058248 A1 | 3/2010 | Park |
| 2010/0281440 A1 | 11/2010 | Underkoffler |
| 2011/0018876 A1 | 1/2011 | Nankervis |

OTHER PUBLICATIONS

Khan et al. 2010 Proceedings of the Symposium on Simulation for Architecture and Urban Design. "BIM-based Building Performance Monitor", SIMAUD 2010—Orlando, FL, USA. Apr. 12-15, 2010, pages Included.*
Khan et al. "Toward a Unified Representation System of Performance-Related Data." eSim 2010. The 6th IBPSA Canada Conference. Winnipeg, May 19-20, 2010.*
Glenn P. Forney, "User's Guide for Smokeview Version 5—A Tool for Visualizing Fire Dynamics Simulation Data", NIST, Aug. 2007.*
Bavoil et al. "Image-Space Horizon-Based Ambient Occlusion", NVIDIA Corporation, SIGGRAPH 2008, Aug. 11-15, 2008.*

(Continued)

*Primary Examiner* — Kee M Tung
*Assistant Examiner* — Nicholas R Wilson
(74) *Attorney, Agent, or Firm* — Patterson & Sheridan, LLP

(57) ABSTRACT

A system and method for displaying a unified representation of performance related data for a building are disclosed. The system includes a sensor network for collecting data in the building and a computing device for generating and displaying a unified representation of performance related data on a display. The performance related data may include the raw data collected by the sensor network or data generated by simulation programs based on the raw data collected by the sensor network. The computing device displays the performance related data in the context of a graphical representation of a three-dimensional model of the building as defined in a building information model (BIM). The computing device generates the graphical representation using an ambient occlusion rendering technique and then incorporates the performance related data either using a direct rendering technique or a transient geometry technique.

22 Claims, 11 Drawing Sheets
(5 of 11 Drawing Sheet(s) Filed in Color)

(56) References Cited

OTHER PUBLICATIONS

Gokce et al. "Improving Energy Efficient Operation of Buildings with Wireless IT Systems", University College Cork, Ireland, 18th International Conference on the Application of Computer Science and Mathematics in Architecture and Civil Engineering, Jul. 7-9, 2009.*

Alahmad et al. "Real Time Power Monitoring & Integration with BIM", IEEE, p. 2454-2458, Nov. 7-10, 2010.*

Ko et al. "Using A CFD Simulation in Designing a Smoke Management System in a Building", Proceedings of the 2006 Winter Simulation Conference, IEEE, 2006.*

International Search Report, PCT/US2012/038460 dated Aug. 17, 2012.

* cited by examiner

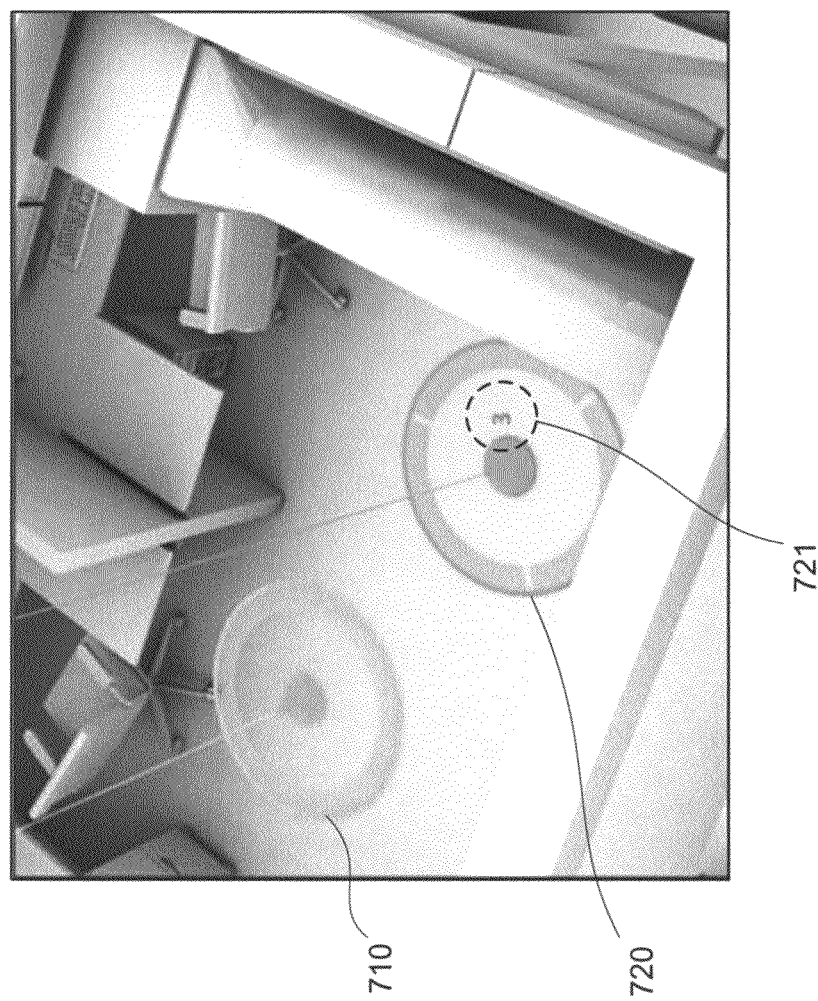

SYSTEMS AND METHODS FOR DISPLAYING A UNIFIED REPRESENTATION OF PERFORMANCE RELATED DATA

BACKGROUND OF THE INVENTION

1. Field of the Invention

The invention relates generally to modeling and simulation software and, more specifically, to systems and methods for displaying a unified representation of performance related data.

2. Description of the Related Art

Environmentally-responsible design goals are an important aspect of many modern architectural projects. An efficient building design not only reduces the impact of urbanization on the environment, but also may reduce operating expenses for the building occupants and creates a better and more useable space to work or live. Furthermore, building efficiency is not a fixed target that may be assessed during the initial design stage but, instead, is a moving target that may evolve over time to respond to changing patterns of building occupancy and the context in which the building is used. Many buildings, once constructed, may be outfitted with instruments that can generate performance related data that provides feedback on the dynamic efficiency of the building throughout the life of the building.

Conventionally, performance related data may be analyzed to determine possible solutions to increase the efficiency of the building or future designs for a new building. For example, lighting or air conditioning systems may be adjusted in areas of the building that have low levels of occupancy during certain times in the day. Typically, performance related data is represented in two-dimensional charts or graphs that plot the data against some reference frame, such as over the course of a day or a year. In addition, the performance related data may be used as input to run various simulations. Such simulations may provide useful information related to, among other things, the intensity and temperature of airflow within the building.

One drawback to conventional techniques for displaying performance related data is that the viewer loses the context of the physical layout of the building when analyzing raw data in charts and graphs. It may be hard for a person to associate an abstract number representing airflow intensity at a given location in a building with the physical layout of the building and systems at that particular location.

As the foregoing illustrates, what is needed in the art is an effective mechanism for visualizing performance related data in the context of a three dimensional model of the building.

SUMMARY OF THE INVENTION

One example embodiment of the present invention sets forth a method for displaying a unified representation of performance related data for a building. The method includes the steps of receiving a building information model that includes three-dimensional (3D) geometry data and metadata related to the building, receiving sensor data that includes one or more values associated with the performance related data, rendering a digital image that includes a representation of the 3D geometry data and a representation of the sensor data, and causing the digital image to be displayed on a display device.

Another example embodiment of the present invention sets forth a computer readable storage medium containing a program which, when executed, performs an operation for displaying a unified representation of performance related data for a building. The operation includes the steps of receiving a building information model that includes three-dimensional (3D) geometry data and metadata related to the building, receiving sensor data that includes one or more values associated with the performance related data, rendering a digital image that includes a representation of the 3D geometry data and a representation of the sensor data, and causing the digital image to be displayed on a display device.

Yet another example embodiment of the present invention sets forth a system for displaying a unified representation of performance related data for a building. The system includes a sensor network configured to collect sensor data in the building that includes one or more values associated with the performance related data. The system also includes a computing device configured to receive a building information model that includes three-dimensional (3D) geometry data and metadata related to the building, receive sensor data that includes one or more values associated with the performance related data, render a digital image that includes a representation of the 3D geometry data and a representation of the sensor data, and cause the digital image to be displayed on a display device.

One advantage of the disclosed approach is that a user may visualize the performance related data within the context of the structure of the building. Conventionally, performance related data for a building is represented as raw data and commonly displayed through charts or graphs. By adding graphical representations of the performance related data to a rendered image of the 3D model, a user may interpret the data with a greater understanding of the interrelated spatial and contextual configuration of the building. Such advancements may promote more efficient buildings to be designed and built in the future, which has positive environmental impacts and may reduce the operating costs of a building.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 7 illustrates another rendering technique for displaying logical data in a two-dimensional view of a three-dimensional building model, according to one example embodiment of the present invention;

For clarity, identical reference numbers have been used, where applicable, to designate identical elements that are common between figures. It is contemplated that features of one example embodiment may be incorporated in other example embodiments without further recitation.

DETAILED DESCRIPTION

In the following description, numerous specific details are set forth to provide a more thorough understanding of the invention. However, it will be apparent to one of skill in the art that the invention may be practiced without one or more of these specific details. In other instances, well-known features have not been described in order to avoid obscuring the invention.

System Overview

Figure 1:
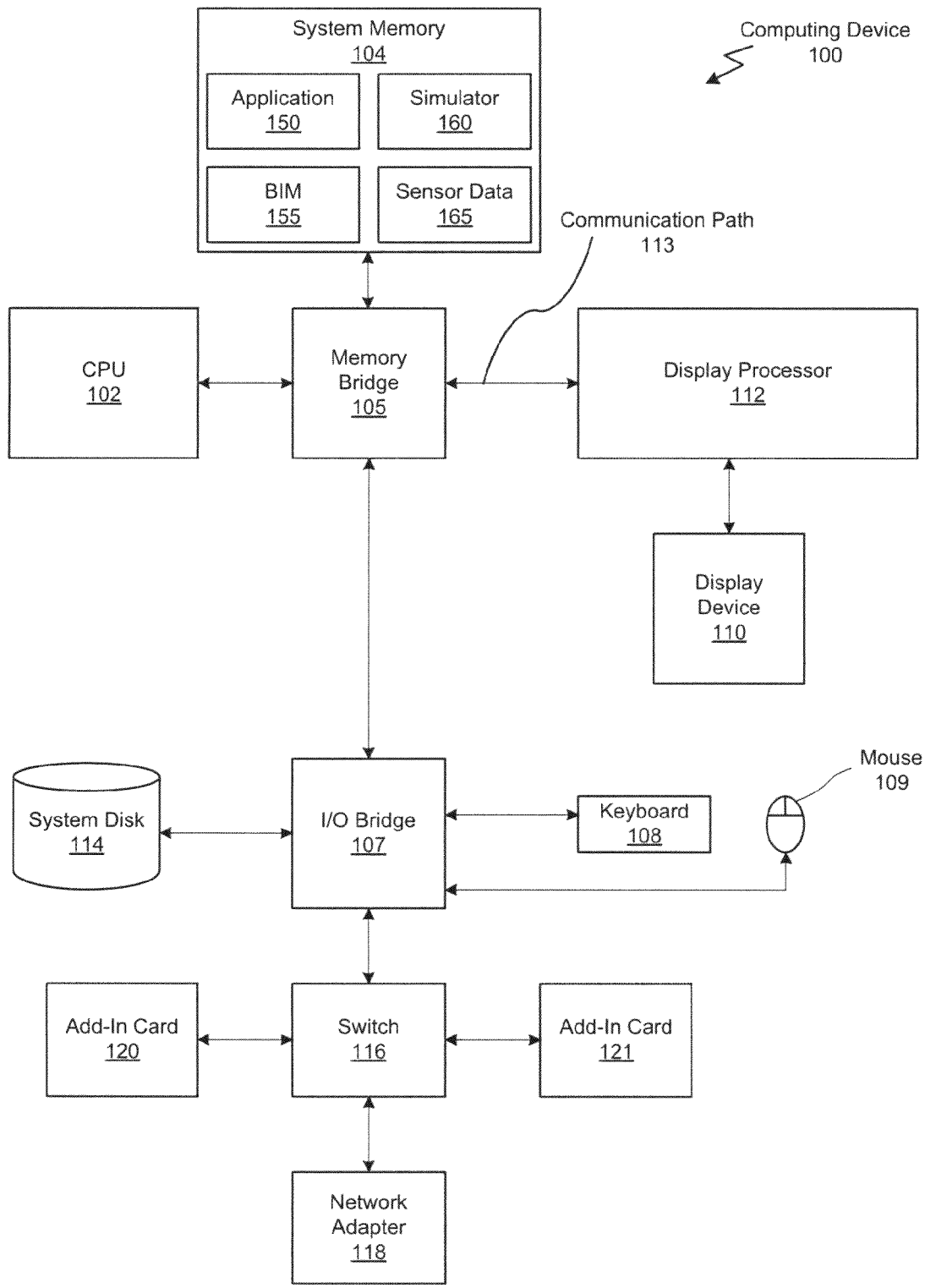
FIG. 1 is a block diagram of a computing device configured to implement one or more aspects of the present invention.

FIG. 1 is a block diagram of a computing device 100 configured to implement one or more aspects of the present invention. Computing device 100 may be a computer workstation, personal computer, or any other device suitable for practicing one or more embodiments of the present invention. As shown, computing device 100 includes one or more processing units, such as central processing unit (CPU) 102, and a system memory 104 communicating via a bus path that may include a memory bridge 105. CPU 102 includes one or more processing cores, and, in operation, CPU 102 is the master processor of computing device 100, controlling and coordinating operations of other system components. System memory 104 stores software applications and data for execution or processing by CPU 102. CPU 102 runs software applications and optionally an operating system. Memory bridge 105, which may be, e.g., a Northbridge chip, is connected via a bus or other communication path (e.g., a HyperTransport link) to an I/O (input/output) bridge 107. I/O bridge 107, which may be, e.g., a Southbridge chip, receives user input from one or more user input devices such as keyboard 108 or mouse 109 and forwards the input to CPU 102 via memory bridge 105. In alternative embodiments, I/O bridge 107 may also be connected to other input devices such as a joystick, digitizer tablets, touch pads, touch screens, still or video cameras, motion sensors, and/or microphones (not shown).

One or more display processors, such as display processor 112, are coupled to memory bridge 105 via a bus or other communication path 113 (e.g., a PCI Express, Accelerated Graphics Port, or HyperTransport link); in one embodiment display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104. Display processor 112 periodically delivers pixels to a display device 110 that may be any conventional CRT or LED monitor. Display processor 112 may be configured to provide display device 110 with either an analog signal or a digital signal.

A system disk 114 is also connected to I/O bridge 107 and may be configured to store content and applications and data for use by CPU 102 and display processor 112. System disk 114 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 116 provides connections between I/O bridge 107 and other components such as a network adapter 118 and various add-in cards 120 and 121. Network adapter 118 allows computing device 100 to communicate with other systems via an electronic communications network, and may include wired or wireless communication over local area networks and wide area networks such as the Internet.

Other components (not shown), including USB or other port connections, film recording devices, and the like, may also be connected to I/O bridge 107. For example, an audio processor may be used to generate analog or digital audio output from instructions and/or data provided by CPU 102, system memory 104, or system disk 114. Communication paths interconnecting the various components in FIG. 1 may be implemented using any suitable protocols, such as PCI (Peripheral Component Interconnect), PCI Express (PCIe), AGP (Accelerated Graphics Port), HyperTransport, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, CPU 102, and I/O bridge 107 to form a system on chip (SoC). In still further embodiments, display processor 112 is omitted and software executed by CPU 102 performs the functions of display processor 112.

Pixel data can be provided to display processor 112 directly from CPU 102. In some embodiments of the present invention, instructions and/or data representing a scene are provided to a render farm or a set of server computers, each similar to computing device 100, via network adapter 118 or system disk 114. The render farm generates one or more rendered images of the scene using the provided instructions and/or data. These rendered images may be stored on computer-readable media in a digital format and optionally returned to computing device 100 for display.

Alternatively, CPU 102 provides display processor 112 with data and/or instructions defining the desired output images, from which display processor 112 generates the pixel data of one or more output images. The data and/or instructions defining the desired output images can be stored in system memory 104 or a graphics memory within display processor 112. In one embodiment, display processor 112 includes 3D rendering capabilities for generating pixel data for output images from instructions and data defining the geometry, lighting, shading, texturing, motion, and/or camera parameters for a scene. Display processor 112 can further include one or more programmable execution units capable of executing shader programs, tone mapping programs, and the like.

In one embodiment, application 150, building information model (BIM) 155, simulator 160, and sensor data 165 are stored in system memory 104. Application 150 is configured to cause computing device 100 to display a unified representation of performance related data for a building on display device 110. For example, application 150 may receive BIM 155 that includes a three-dimensional (3D) model of a building as well as performance related data (i.e., sensor data 165 or output from simulator 160) associated with the building and generate a two-dimensional (2D) view of at least a portion of the 3D model that includes a graphical representation of the performance related data. For example, application 150 may generate a 2D view that includes text overlaid on the 2D view to show the average electricity consumption for that portion of the building.

BIM 155 is a data structure that includes information based on an object-oriented design model for describing a building. BIM 155 may include one or more data objects for identifying building geometry, spatial relationships between objects, geographic information, quantities and properties of building components, and like data. For example, BIM 155 may include data objects that describe the foundation, walls, HVAC components (heating, ventilation and air conditioning), electrical components, windows, and doors for a building. In one embodiment, BIM 155 includes one or more objects that define the layout and characteristics of a building as well as metadata associated with the objects that provides information related to the building, such as the type or cost of building components or information related to the manufacturer of a building component. BIM 155 may be generated using one or more applications configured to create or modify the building model, such as Autodesk® ReVit® Architecture building design software. Objects included in BIM 155 may be defined parametrically such that modifying one object causes certain related objects to be automatically modified as well. For example, BIM 155 may include rules for the minimum and maximum distance between windows related to a particular wall object. By changing the length of the wall object in BIM 155, the number of windows related to the wall may be changed.

In one embodiment, BIM 155 conforms to the National Building Information Model Standard (NBIMS), version 1.0, as defined by the National Institute of Building Sciences. BIM 155 may be stored in system memory 104 with an IFC-XML file format, as defined by ISO 10303-28, to enable BIM 155 to be exchanged between different applications. In alternative embodiments, BIM 155 may define any hierarchical subset of data objects capable of enabling computing system 100 to generate a 2D view of the 3D building model in BIM 155.

Application 150 is configured to import BIM 155 and may be configured to convert between different file formats for BIM 155. Application 150 may also be configured to generate a 2D view of the 3D model defined in BIM 155 and can include navigational tools to allow a user to view the 3D model at various levels of detail. For example, a user could view the entire building from an external camera position or the user could view a particular room in the building from an interior camera position.

Simulator 160 is an application configured to perform one or more simulations based on the 3D model of the building in BIM 155. In one embodiment, simulator 160 may simulate the temperature and intensity of airflow in the building. Such simulations may take the location of vents and HVAC components included in BIM 155 as input and use these objects and the data related to these objects as boundary conditions for the simulation. Simulator 160 may also utilize the geometry of the building included in BIM 155 to run the simulation. Simulator 160 may setup default boundary conditions for the simulation (such as external temperature, thermostat settings, airflow temperature or velocity, etc.) or may use real-world data collected from sensors placed in a building built according to the design defined in BIM 155.

Sensor data 165 is performance related data collected from one or more sensors placed throughout a building corresponding to BIM 155. The data may be collected manually and stored in system memory 104 for use with simulator 160. Alternatively, sensor data 165 may be collected automatically from one or more sensors configured to transmit data to computing device 100. Simulator 160 may be configured to use sensor data 165 as an input to one or more simulations. For example, airflow sensors placed near vents in the completed building may be associated with a vent data object in BIM 155. Simulator 160 may then use the sensor data 165 collected from the sensor to define boundary conditions for the simulation. The sensor data 165 may provide the simulator 160 with information about how much air (and potentially at what temperature) is flowing into the building at a particular vent. The simulator 160 may then calculate how that air circulates through the building using the geometry information stored in BIM 155 as well as one or more mathematical models based on computational fluid dynamics analysis. It will be appreciated that simulator 160 is not limited to fluid dynamics simulations and other technically feasible simulations are contemplated in other embodiments of the present invention.

It will be appreciated that the computing device shown herein is illustrative and that variations and modifications are possible. The connection topology, including the number and arrangement of bridges, may be modified as desired. For instance, in some embodiments, system memory 104 may be connected to CPU 102 directly rather than through a bridge, and other devices may communicate with system memory 104 via memory bridge 105 and CPU 102. In other alternative topologies display processor 112 may be connected to I/O bridge 107 or directly to CPU 102, rather than to memory bridge 105. In still other embodiments, I/O bridge 107 and memory bridge 105 may be integrated in a single chip. In addition, the particular components shown herein are optional. For instance, any number of add-in cards or peripheral devices might be supported. In some embodiments, switch 116 is eliminated, and network adapter 118 and add-in cards 120, 121 connect directly to I/O bridge 107.

Figure 2:
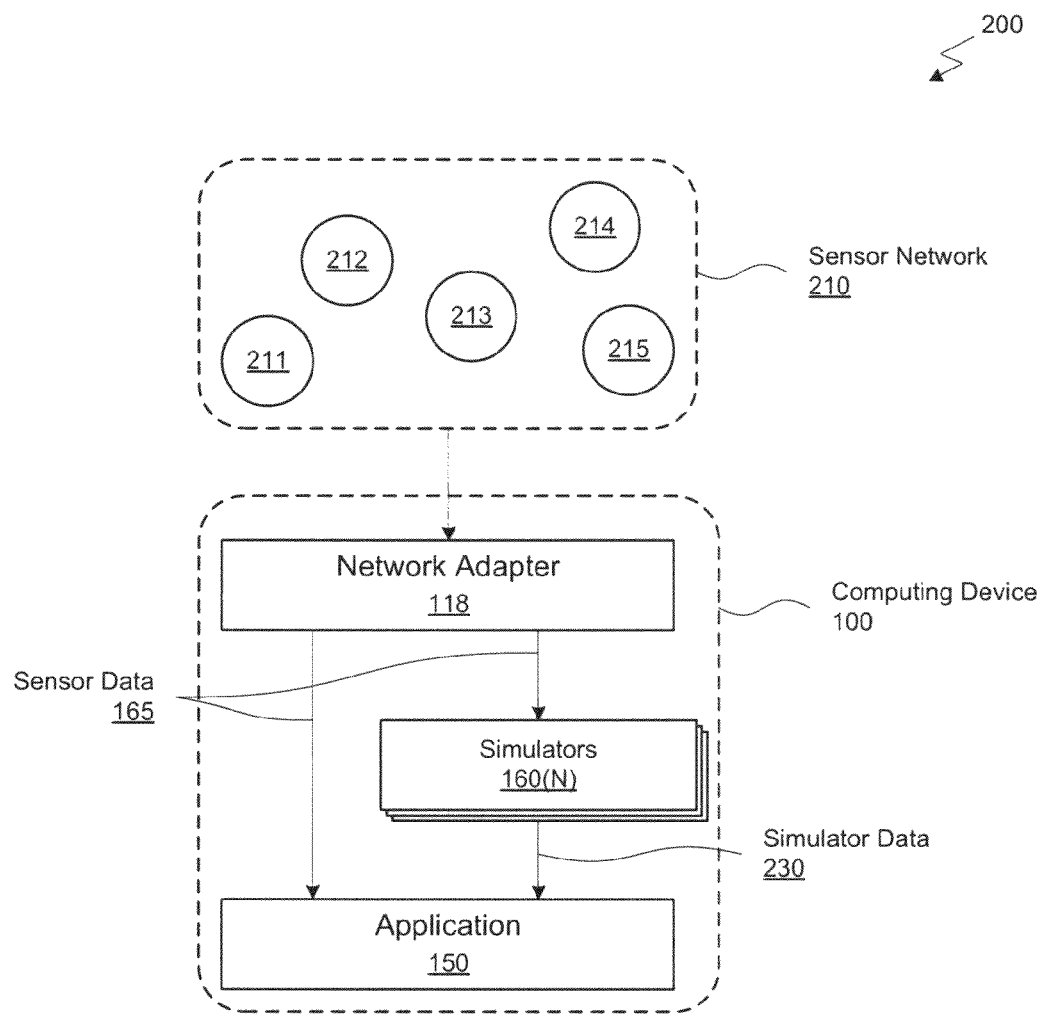
FIG. 2 is a block diagram of a system configured to collect and display performance related data for a building, according to one embodiment of the present invention.

FIG. 2 is a block diagram of a system 200 configured to collect and display performance related data for a building, according to one embodiment of the present invention. As shown, system 200 includes computing device 100 of FIG. 1 coupled to a sensor network 210. Sensor network 210 includes one or more sensors (211, 21, 213, 214, 215, etc.) configured to monitor and collect performance related data associated with the building defined in BIM 155. For example, sensor 211 may be an airflow sensor that is placed near an air vent in the building to monitor the temperature and velocity of the air passing through the air vent. Sensors 212 and 213 may be light switch monitors that monitor whether a particular light is turned on at any given time. Sensor 214 may be a current sensor that monitors the amount of electricity consumed at a particular electrical outlet or by a particular electrical circuit in the building. Sensor 215 may be a chair sensor that indicates when a chair is occupied. Sensor 215 may be used to monitor the work habits of the building tenants, such as by providing information about how often an individual is sitting at a desk. The examples described above are only a small subset of the possible types of sensors that may be included in sensor network 210. Other types of sensors that collect other performance related data are contemplated to be within the scope of the present invention.

Sensor network 210 is connected to computing device 100 to transmit sensor data 165 to computing device 100 and cause sensor data 165 to be stored in system memory 104. In one embodiment, the sensors of sensor network 210 are wireless sensors that are configured to connect to computing device 100 via a wireless network. Network adapter 118 may be a wireless network adapter that is configured to establish a connection with sensors within range of the wireless network adapter 118. In another embodiment, the sensors of sensor network 210 may be hard-wired to computing device 100. Each sensor may be connected to a local area network (LAN) connected via Ethernet. Alternatively, computing device 100 may include an add-in card 120, 121 that is configured with a proprietary sensor interface for receiving sensor data 165 from the sensor network 210. In yet other embodiments, sensor network 210 may include one or more devices configured to collect data from one or more sensors and then forward the aggregated sensor data to computing device 100. In still other embodiments, sensor network 210 may not be connected to computing device 100. In such embodiments, the sensors may store performance related data locally until a user manually transfers the data from the sensor to system memory 104 of the computing device 100. For example, a sensor may have a local memory that is capable of storing performance related data collected over a period of time. The sensor may include a communications interface such as a USB™ (Universal Serial Bus) interface. The user may download the collected data from the sensor to a USB™ flash storage device and then transfer the data from the USB™ flash storage device to system memory 104 via the USB™ interface connected to the computing device 100. Any technically feasible interface may be used to transmit sensor data 165 to computing device 100.

Once sensor data 165 is transferred to computing device 100, sensor data 165 may be transmitted to application 150 as well as to one or more simulators 160 that are configured to generate simulator data 230. As described above, simulators 160 may receive sensor data 165 as input to define boundary conditions for one or more simulations. Types of simulations may include airflow, thermal, energy, occupancy or any other technically feasible types of simulations related to building performance data. For example, simulator 160 may perform a complex simulation based on a computational fluid dynamics model. Simulator data 230 may be generated based on the computational fluid dynamics model. Once the simulation is complete, simulator data 230 may be transmitted to or read by application 150 in addition to the raw sensor data 165.

Application 150 may include a transfer function (not shown) that receives sensor data 165 and simulator data 230 as input. The transfer function may be configured to analyze the sensor data 165 and/or simulator data 230 to generate visualization data for display in a 2D view of the 3D model via one or more different visualization techniques. The transfer function may perform quantization, biasing, scaling, normalizing, or filtering of the sensor data 165 or simulator data 230. For example, raw temperature data from sensor network 210 may be quantized such that each value represents one of a plurality of temperature ranges that are mapped to different colors representative of the measured temperature. Similarly, the raw temperature data may be normalized before quantization such that the minimum and maximum values are mapped more closely to the extreme ends of the temperature scale.

Sensor data 165 and simulator data 230 may be logical data, scalar data, vector data, or semantic data. Logical data are discrete data points with two possible states (i.e., true or false). Logical data may be used to describe the presence or absence of an event, person, object, or a selection. For example, a sensor that collects input related to whether a chair is occupied or whether a light switch is on may be stored as logical data. Such data may be represented by a single bit. Scalar data are continuous one-dimensional values. Scalar data may be used to describe scalar values such as a temperature measurement or energy consumption. For example, a sensor placed near an electrical outlet may be configured to monitor average current draw at the electrical outlet over a certain time period and store the energy consumption as a floating point value that represents the current drawn by the electrical outlet. Vector data are continuous real values with both a direction and magnitude. Vector data may be used to describe vector values such as air velocity. For example, a sensor at an air vent may measure air velocity moving in a direction normal to the surface of the air vent or in one or more directions based on the configuration of baffles in the air vent. Semantic data are information that relates to properties of objects. Semantic data may be associated with objects in BIM 155 by adding metadata to the objects. For example, a label can be associated with an object to identify that object within the building model. The semantic data may be used to associate data from a particular sensor with an object or location within the 3D model of the building.

Figure 3:
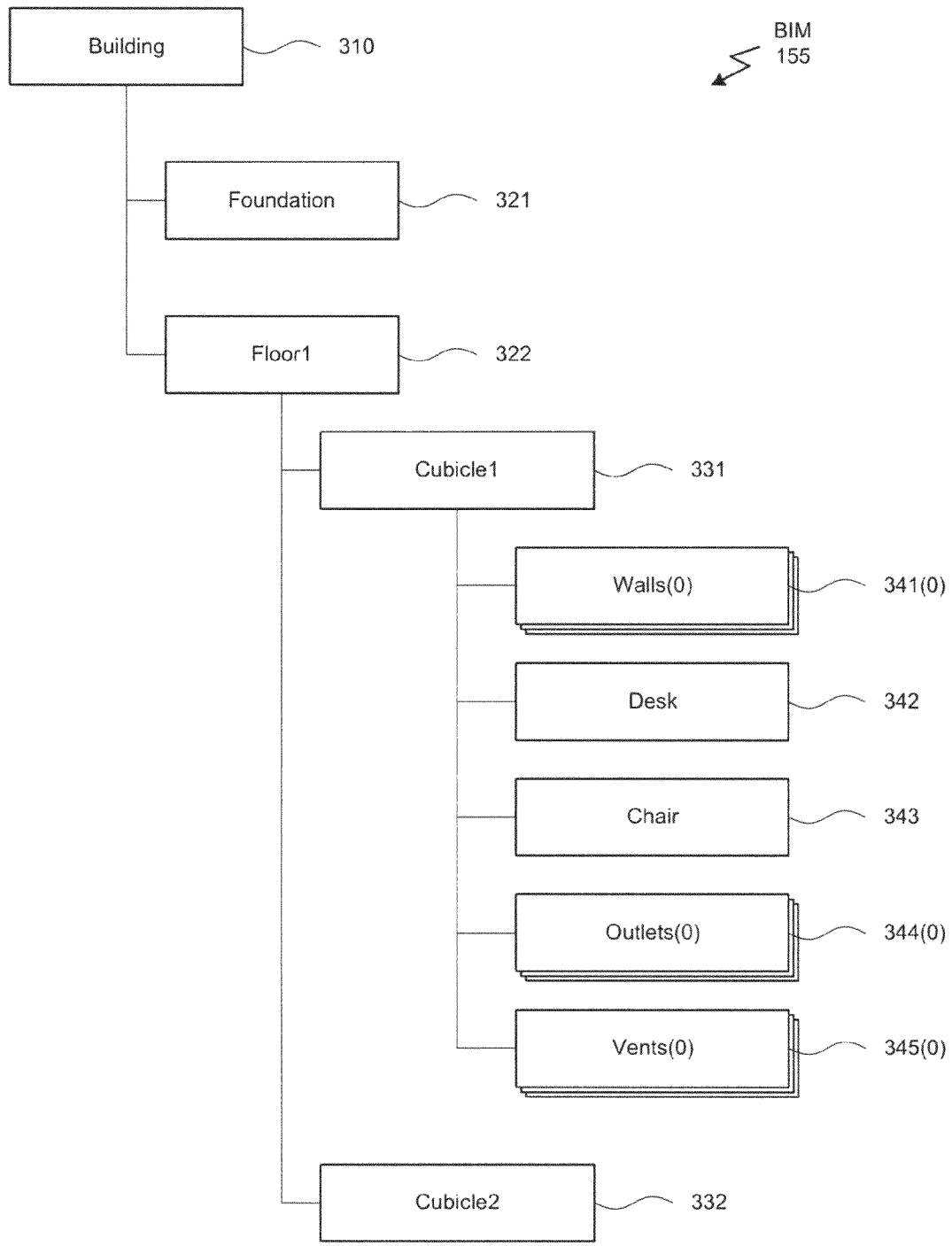
FIG. 3 illustrates a conceptual illustration of BIM, according to one example embodiment of the present invention.

FIG. 3 illustrates a conceptual illustration of BIM 155, according to one example embodiment of the present invention. As shown, BIM 155 includes a root object 310 ("Building"). The root object is associated with one or more objects that form the complete description of the 3D model of the building. For example, a foundation object 321 and a floor object 322 are shown as being associated with the root object 310. The foundation object 321 may include data related to the geographic location of the foundation footprint, surfaces and points that describe the physical structure of the foundation, and building materials that are included in the foundation. Although not shown, the foundation object 321 may include one or more additional objects that comprise the foundation object 321. The floor object 322 may describe the first floor of the building and may be associated with sub-objects such as a first cubicle object 331 and a second cubicle object 332. Each cubicle object 331, 332 may include information about the size and location of a cubicle in relation to the floor, an identifier (ID) that identifies the cubicle within the building model, and one or more sub-objects that define different objects in the cubicle. For example, the first cubicle object 331 may include objects for one or more walls 341, a desk 342, a chair 343, one or more electrical outlets 344 and one or more air vents 345. The format of the various data objects may be defined by a standard such as NBIMS. Further, the objects shown in FIG. 3 do not represent every object in BIM 155 but merely illustrate the conceptual organization of the BIM 155 data structure according to one embodiment.

Each object in BIM 155 may be defined via some type of design software such as Autodesk® Revit® Architecture software. Furthermore, manufacturers of particular building components may design objects that describe that building component and provide those objects in a universal file format to be included in a larger building design. For example, an HVAC manufacturer may design a 3D model of a boiler or an air conditioning unit to be included in a building design. An architect may then download a master copy of the component and place instances of the component in the BIM 155 for a building. The manufacturer may include metadata associated with the component that includes properties for the component such as price, weight, electrical requirements, etc. The data object for the component may also define one or more interfaces for connecting the component to additional systems in the building. For example, an air conditioner may include a duct for cooled air to flow to the air ducts in the building as well as information related to a maximum output capability of the air conditioner. This information may be useful when performing simulations to determine whether the design of the HVAC system of the building is adequate.

Figure 4A:
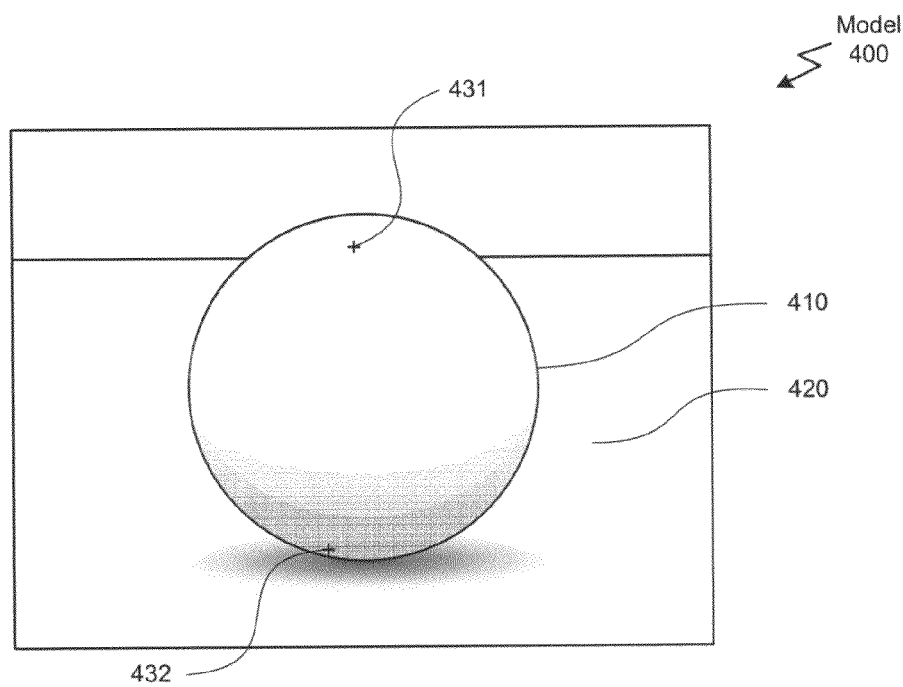
FIGS. 4A-4B illustrate one rendering technique for generating a two-dimensional view of the three-dimensional building model, according to one example embodiment of the present invention.
Figure 4B:
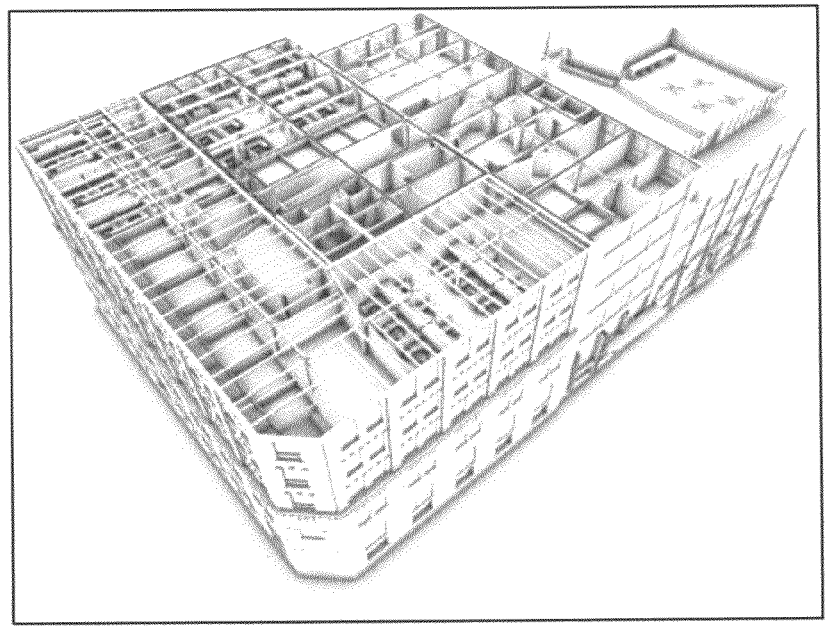

FIGS. 4A-4B illustrate one rendering technique for generating a two-dimensional view of a three-dimensional building model, according to one example embodiment of the present invention. As shown in FIG. 4A, a 3D model 400 defines two 3D objects, a surface 420 and a sphere 410 located proximate to the surface 420. FIG. 4A illustrates a 2D view of the 3D scene defined in model 400 where the camera position and orientation are focused on the sphere 410. An exemplary rendering technique for displaying a graphical representation of the 3D model 400 utilizes an ambient occlusion rendering technique, which is a global illumination technique that represents spatial relationships between surfaces. One method for calculating the color of a pixel in the 2D view using ambient occlusion is to determine a point on a surface of an object in the 3D view that corresponds to the pixel. For example, point 431 corresponds to a point near the top of sphere 410 that is rendered at a particular pixel in the 2D view based on the camera position and orientation. A graphics processor, such as display processor 112 or CPU 102, may then calculate a scalar value for that point which is based on the proximity of other surfaces to that point. For example, a processor may generate random rays that originate from that point in the 3D model. The rays may be directed in any direction within a hemisphere centered on that point and oriented around the normal of the surface at that point. The graphics processor then determines a distance from the point to the next nearest surface, if any, in the direction of the ray. The graphics processor adds the calculated distance to a sum of distances calculated for a plurality of additional rays directed in random directions from the point to determine a scalar value associated with the proximity of other surfaces to that point. If the point is proximate to other surfaces then the pixel is rendered using a darker shading. However, if the point is not proximate to other surfaces then the pixel is rendered using a lighter shading.

For example, as shown in FIG. 4A, point 431 is located near the top of the sphere 410. Most of the rays that are directed from point 431 do not intercept another surface until the rays intercept the background of the 3D model. Therefore, the scalar value calculated for point 431 will be relatively large and the graphics processor will shade a pixel corresponding to point 431 as a relatively light color, such as white or light gray. In contrast, point 432 is located near the top of the sphere 410, near the point of contact between sphere 410 and surface 420. Consequently, many of the rays that originate from point 432 will intercept surface 420 within a relatively short distance. Thus, the scalar value calculated for point 432 will be relatively small, and the graphics processor will shade a pixel corresponding to point 432 as a relatively dark color, such as black or dark gray.

The described rendering technique (i.e., the ambient occlusion rendering technique) avoids photorealistic texturing and lighting of the 3D model. One advantage to this technique is that ambient occlusion removes the necessity to define light sources in the 3D model for rendering purposes. Another advantage is that lighting-neutral rendering techniques are less likely to overpower the visualization of data due to lighting effects. For example, a light source defined in the 3D model may cause a surface to be rendered almost entirely white or entirely dark in the 2D view based on the direction and intensity of the light source. A user may have a difficult time viewing the geometry of the 3D model if the lighting is not optimally defined. The ambient occlusion technique described above presents one effective way to minimize extraneous visual information in the 2D view of the 3D model while also providing spatial context to a user for visualizing the performance related data.

FIG. 4B illustrates a two-dimensional view of a three-dimensional building model 401 rendered using an ambient occlusion rendering technique. As shown in FIG. 4B, a user may easily visualize the structure of the building including the layout of a floor and the contents of particular rooms. Building model 401 may be included in BIM 155 and may be rendered by application 150 executing on computing device 100. Application 150 may optionally utilize display processor 112 to perform rendering operations related to generating the 2D views of FIG. 4B. In alternative embodiments, other rendering techniques may be used in lieu of the ambient occlusion technique described above.

Various rendering techniques are used to display graphical representations of the sensor data 165 and the simulator data 230 in a rendered two-dimensional view of the three-dimensional building model. Such rendering techniques enable a viewer to visualize the performance related data within the context of the building. The shape, form and relative position of objects within the 3D model are important in order to relate the data to the physical characteristics of the building. Two rendering techniques, direct rendering and transient geometry, are discussed below. Direct rendering techniques display the data by changing the visualization of geometry included in the 3D building model. For example, by changing the color of a surface or object in the scene. In contrast, transient geometry techniques display the data by including new geometry not include in the 3D building model in the scene. For example, by adding a graphical overlay or rendering a vector field using 3D arrows.

Visualization using Direct Rendering Techniques

Figure 5C:
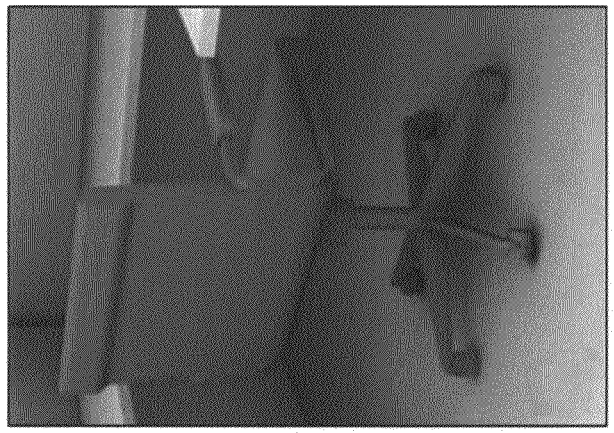
FIGS. 5A-5C illustrate one rendering technique for displaying logical data in a two-dimensional view of a three-dimensional building model, according to one example embodiment of the present invention.
Figure 5B:
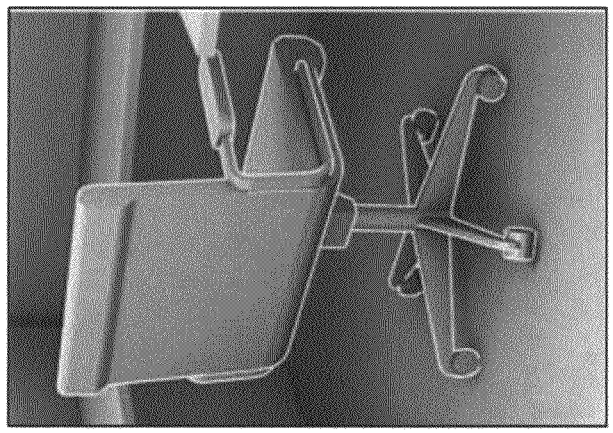
Figure 5A:
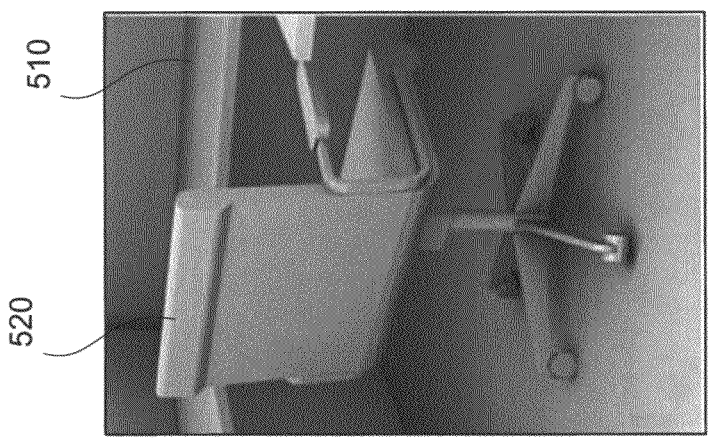

FIGS. 5A-5C illustrate one rendering technique for displaying logical data in a two-dimensional view of a three-dimensional building model, according to one example embodiment of the present invention. As shown in FIG. 5A, a view of a cubicle in the building shows a chair located at a desk in the cubicle. BIM 155 includes a desk data object 510 and a chair data object 520 that define the geometry (i.e., surfaces or volumes) for the corresponding real-world objects. Application 150 may be configured to extract the geometry information from BIM 155 and render the scene using an ambient occlusion rendering technique. Sensor network 210 may include a sensor located in the chair that corresponds to the chair data object 520. Application 150 may be configured to parse sensor data 165 to determine whether the chair is occupied at a particular point in time. In one embodiment, sensor data 165 includes an array associated with the chair sensor that stores logical data values indicating that the chair is either occupied or unoccupied. Application 150 may search the array in sensor data 165 to determine whether the logical data value corresponding to a particular point in time is true or false.

As shown in FIG. 5B, application 150 may add a graphical representation of the logical data related to the chair sensor using a direct rendering technique such as drawing a distinct outline around the silhouette for the chair data object 520 of FIG. 5A. Alternatively, as shown in FIG. 5C, application 150 may add a graphical representation of the logical data using a different technique such as highlighting the object by shading the object with a colored hue that is different from the normal color used to shade the surface of the object. Such techniques can also be applied to other objects in the 3D building model, such as by drawing an outline or highlighting an air vent object whenever air is being forced through the vent.

Figure 6:
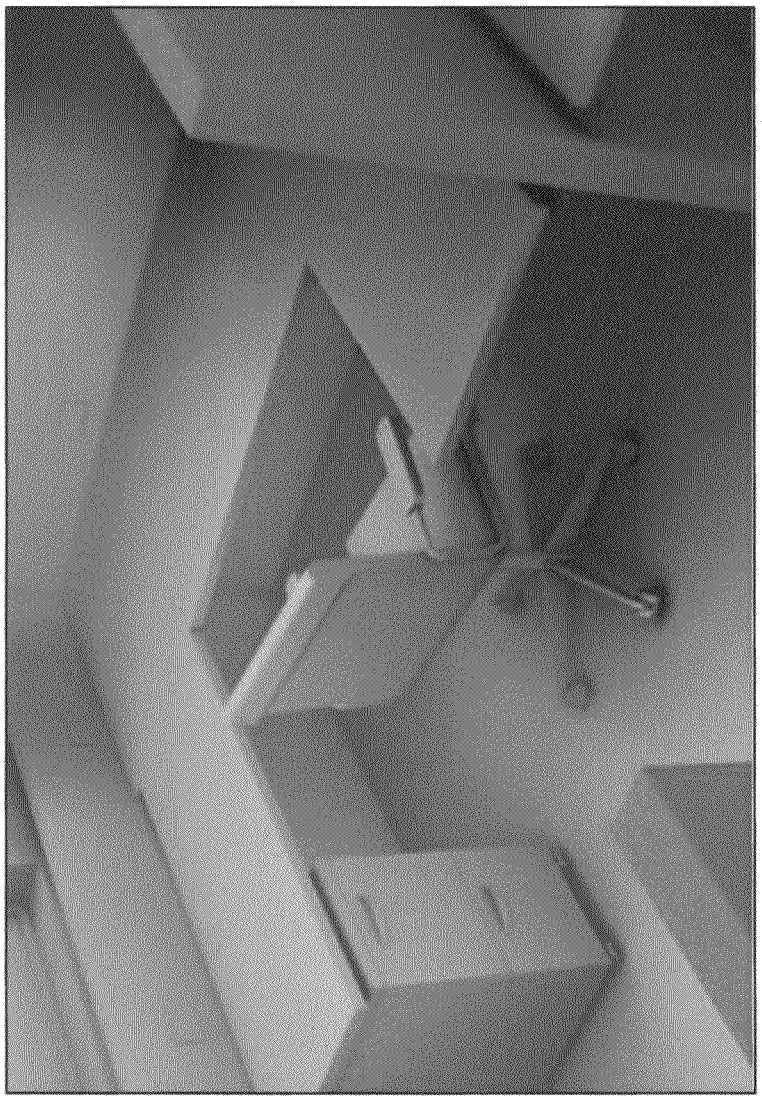
FIG. 6 illustrates one rendering technique for displaying scalar data in a two-dimensional view of a three-dimensional building model, according to one example embodiment of the present invention.

FIG. 6 illustrates one rendering technique for displaying scalar data in a two-dimensional view of a three-dimensional building model, according to one example embodiment of the present invention. Although the outlining and highlighting techniques described above in connection with FIGS. 5A-5C are effective for visualizing logical data, other techniques may be better suited for visualizing different types of data like scalar data or vector data. As shown in FIG. 6, scalar data such as temperature data may be better visualized using more complex shading techniques. In one embodiment, simulator 160 may generate simulator data 230 that includes a plurality of scalar fields within a volumetric field defined by the 3D model. Each scalar field represents the temperature field in the cubicle at a particular point in time. For example, the simulator 160 may generate a plurality of scalar values representing a calculated temperature at a plurality of equally spaced points within the 3D space occupied by the cubicle in the 3D building model. Using airflow information from sensor data 165 that corresponds to an air vent object proximate to the cubicle, simulator 160 may simulate the temperature field in the cubicle based on thermodynamic analysis models and computational fluid dynamics analysis models.

Application 150 may then render the 2D view using complex surface shading to represent the scalar field for a particular point in time. Each point on a surface may be rendered using a different color based on the scalar value associated with the nearest point in the scalar field. In alternative embodiments, the point on the surface may be rendered based on an interpolation of two or more points in the scalar field. As shown in FIG. 6, warmer temperatures may be represented using "warmer" colors such as red or yellow and cooler temperatures may be represented using "cooler" colors such as blue or green. Such shading techniques enable a viewer to quickly visualize the scalar data within the context of the 3D model.

Visualization using Transient Geometry Techniques

FIG. 7 illustrates another rendering technique for displaying logical data in a two-dimensional view of a three-dimensional building model, according to one example embodiment of the present invention. In one embodiment, logical data may be displayed using glyphs (710, 720, etc.). Glyphs are symbolic representations of single data points. Peg glyphs may be used to display logical data in the 2D view of the 3D building model. Peg glyphs include a base portion and a stem portion. The base portion is a 2D representation displayed on a plane that passes through a point in the 3D model, such as a point on the floor of a building. The stem portion is an object that extends in a direction normal to the plane of the base. Thus, no matter how the glyph is oriented in the scene, the glyph is always visible.

Glyphs may be used to mark particular points of interest in 3D space, in particular, points associated with data that originated from a sensor. For example, room occupancy may be displayed using glyphs. As shown in FIG. 6, glyph 710 indicates that a person occupies the cubicle on the left in the 3D building model. Glyphs may also be aggregated when they are within a certain radius within the 3D model. Glyphs that represent aggregated data may be distinguished from non-aggregated glyphs using different colors, text, or segmentation of the base. For example, each chair in a room may include a sensor that indicates occupancy. Rather than displaying a different glyph 710 for each chair that is occupied, application 150 may calculate the total number of occupants in the room and display a single glyph 720 that includes a scalar indicator 721 that indicates the total number of occupants in the room. As shown, glyph 720 indicates that three people are in the cubicle on the right in the 3D building model. To distinguish glyph 710 (non-aggregated) from glyph 720 (aggregated), glyph 710 is displayed using a blue color and glyph 720 is displayed using a pink color. The base of glyph 720 is also segmented into three distinct portions.

Figure 8B:
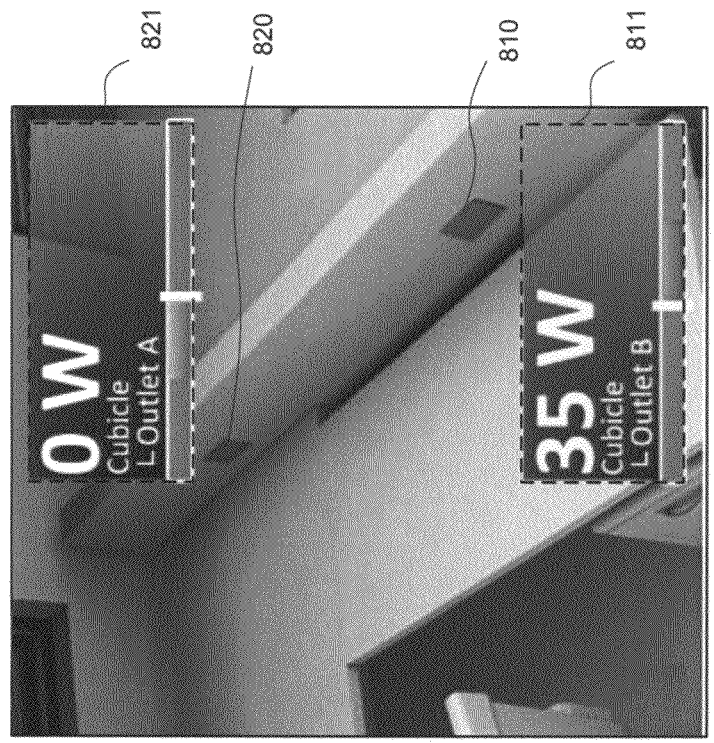
FIGS. 8A-8B illustrate yet another rendering technique for displaying data in a two-dimensional view of a three-dimensional building model, according to one example embodiment of the present invention.
Figure 8A:
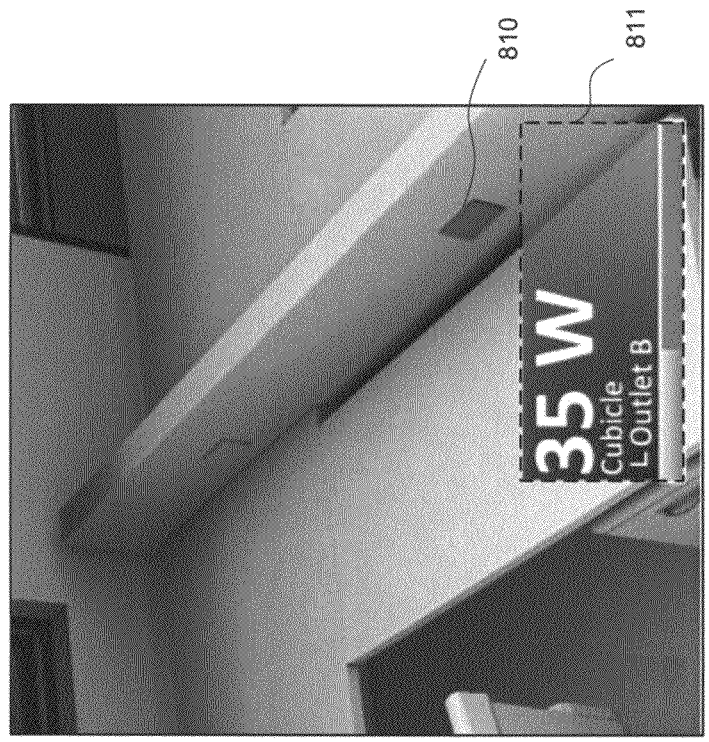

FIGS. 8A-8B illustrate yet another rendering technique for displaying data in a two-dimensional view of a three-dimensional building model, according to one example embodiment of the present invention. As shown in FIG. 8A, application 150 may render a 2D view that includes a graphical overlay, or heads-up-display (HUD), such as HUD 811. HUD 811 may display logical data, scalar data, vector data, semantic data, or some combination thereof. For example, HUD 811 includes scalar data ("35 W") associated with the measured energy consumption of electrical outlet 810. HUD 811 also includes semantic data that shows that electrical outlet 810 is identified in BIM 155 as "Outlet B" and has a relation to the Cubicle object. HUD 811 also includes a colored bar at the bottom of the graphical overlay that indicates the percentage of energy consumed by electrical outlet 810 in relation to all electrical outlets in the cubicle or, alternatively, the relative energy use of the electrical outlet 810 in comparison to the average electrical outlet for the building.

As also shown in FIG. 8A, application 150 may combine direct rendering techniques with transient geometry rendering techniques. For example, application 150 has rendered electrical outlet 810 with a green hue in order to distinguish the object in the 2D view that is associated with HUD 811. In one embodiment, HUD 811 is located at a position in the 2D view that is proximate to the rendered position of the electrical outlet 810 in the 2D view. In alternative embodiments, HUD 810 may be located anywhere in the 2D view, such as proximate to the right side in the digital image of the rendered scene.

As shown in FIG. 8B, application 150 may render multiple HUDs in the same 2D view. HUD 811 is similar to HUD 811 in FIG. 8A and is associated with electrical outlet 810. In addition, a second HUD 821 is associated with a second electrical outlet 820 of the cubicle. HUD 821 is similar to HUD 811 except that HUD 821 displays information related to electrical outlet 820 instead of electrical outlet 810. Outlet 820 is identified in BIM 155 as "Outlet A" and also has a relation to the same Cubicle object as outlet 810. As shown, outlet 820 is consuming 0 Watts of electricity. As also shown in FIG. 8B, the colored bars at the bottom of the HUDs indicate the relative energy use of the electrical outlets 810, 820 in comparison to the average electrical outlet for the building.

Figure 9:
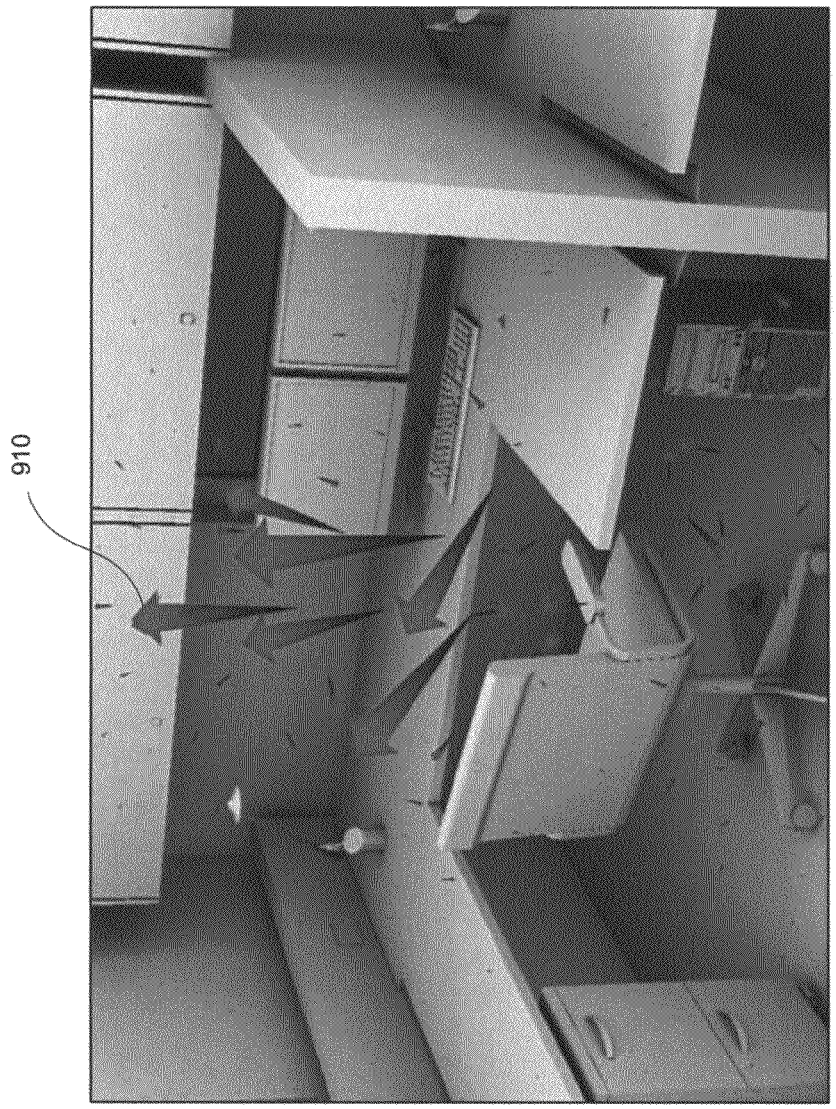
FIG. 9 illustrates one rendering technique for displaying vector field data in a two-dimensional view of a three-dimensional building model, according to one example embodiment of the present invention.

FIG. 9 illustrates one rendering technique for displaying vector field data in a two-dimensional view of a three-dimensional building model, according to one example embodiment of the present invention. In one embodiment, an array of sensors in sensor network 210 may capture a vector field for the 3D building model representing one point in time. In another embodiment, simulator 160 may use sensor data 165 to generate a vector field in simulator data 230 based on one or more analysis models. Each vector in the vector field may be displayed in the 2D view by rendering a 3D arrow within the 2D view. For example, arrow 910 is rendered in the 2D view to represent one vector in the vector field. The base of arrow 910 originates in the 3D location associated with the vector (i.e., the sensor location or the location based on the simulation), and the size of arrow 910 and orientation of arrow 910 is based on the direction and magnitude of the vector. By rendering a different 3D arrow for each vector in the vector field, the vector field can be visualized in the context of the 3D building model.

Figure 10:
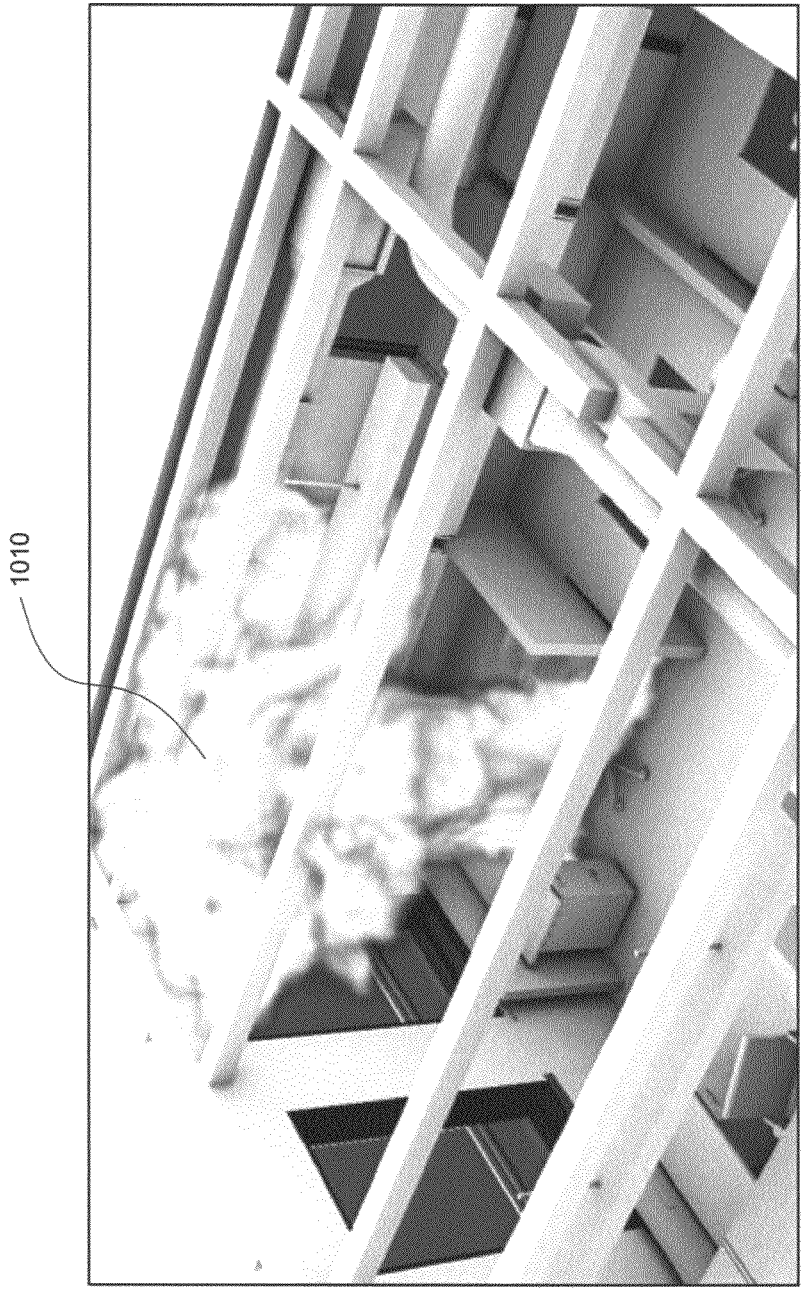
FIG. 10 illustrates a volumetric rendering technique for displaying data in a two-dimensional view of a three-dimensional building model, according to one example embodiment of the present invention.

FIG. 10 illustrates a volumetric rendering technique for displaying data in a two-dimensional view of a three-dimensional building model, according to one example embodiment of the present invention. The volumetric rendering technique enables a viewer to comprehend the relationship between airborne particles and the structure and geometry of the 3D building model. As shown in FIG. 10, simulator 160 may be configured to output a simulated volume 1010 (i.e., a plume object) that expands at a rate that simulates a rate of diffusion of particles in the air. For example, the volumetric rendering technique may be used to visualize smoke or the diffusion of airborne contaminants. In one embodiment, a user of application 150 may specify 3D cutting planes that only render a portion of the simulated volume to isolate specific slices of the volume at a given point in time. In alternative embodiments, application 150 may be configured to shade different portions of the volume in different ways, such as by shading different portions using different levels of transparency, thereby revealing inner features of the data field.

It will be appreciated by one of skill in the art that application 150 may render multiple sets of data using one or more of the rendering techniques described above in the same two-dimensional view of the three-dimensional building model. For example, the 2D view may include both direct rendering techniques for logical data and complex surface shading techniques or a heads-up-display for scalar data.

Figure 11:
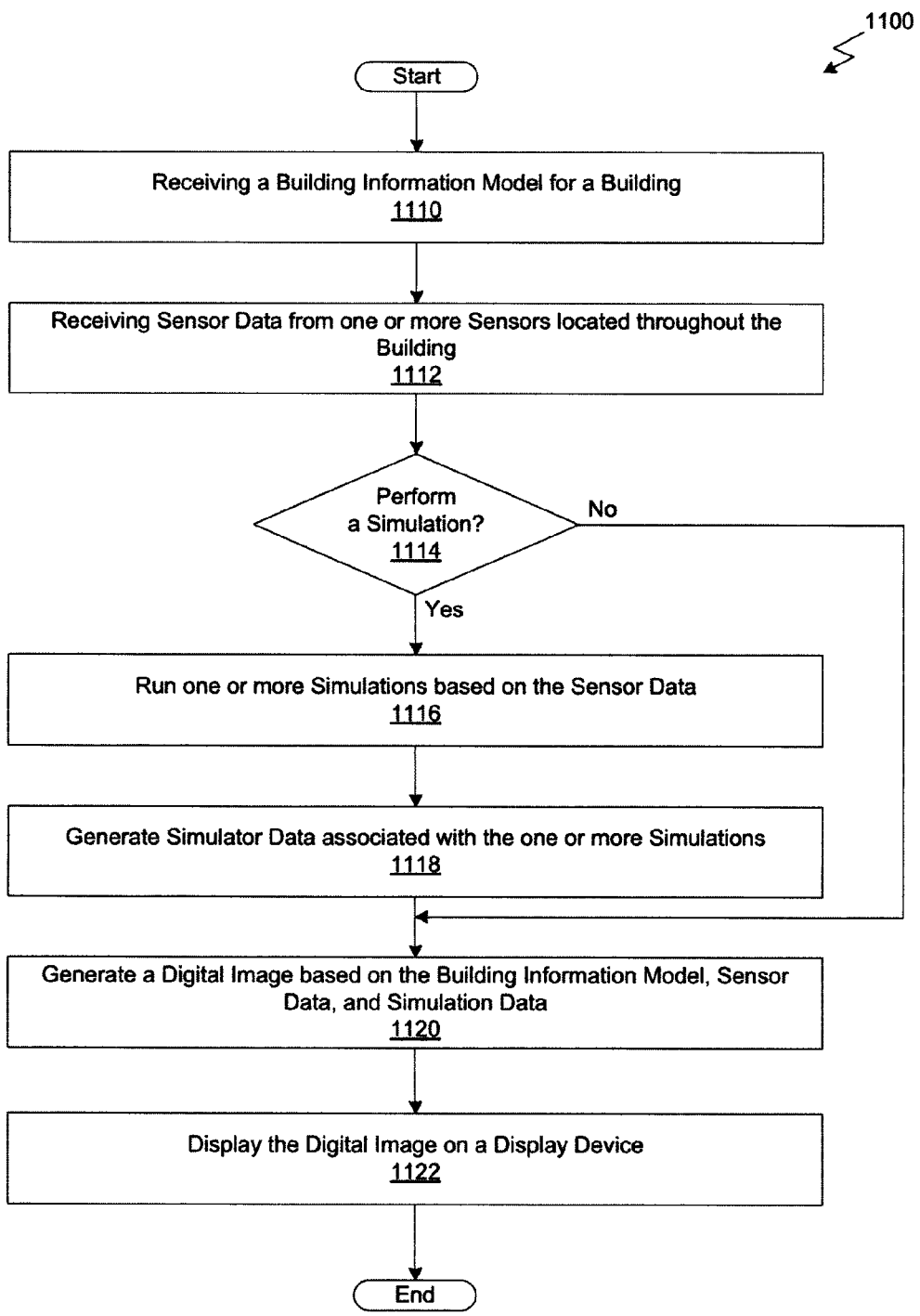
FIG. 11 is a flowchart of method steps for displaying a unified representation of performance related data for a building, according to one example embodiment of the present invention.

FIG. 11 is a flowchart of method steps 1100 for displaying a unified representation of performance related data for a building, according to one example embodiment of the present invention. Although the method steps are described in conjunction with the systems of FIGS. 1-10, persons skilled in the art will understand that any system configured to perform the method steps, in any order, is within the scope of the inventions.

The method 1100 begins at step 1110, where computing device 100 receives a building information model (BIM) 155 for a building. In one embodiment, the BIM conforms to a National Building Information Model Standard (NBIMS), version 1.0, as defined by the National Institute of Building Sciences. The BIM 155 includes geometry data that defines the components of the building, such as floors, walls, heating systems, etc., as well as metadata related to the components. At step 1112, computing device 100 receives sensor data 165 from one or more sensors in sensor network 210 that are located throughout the building. For example, sensor 211 may be an airflow sensor that is placed near a vent in the building to monitor the temperature and velocity of the air passing through that vent. In one embodiment, the sensors of sensor network 210 may be configured to transmit sensor data 165 to computing device 100 via a radio frequency signal over a wireless network. Computing device 100 may receive the sensor data 165 via a wireless network adapter 118.

At step 1114, computing device 100 determines whether to run a simulation. In one embodiment, application 150 may include a graphical user interface that enables a user to manually select whether to run a simulation. Application 150 may prompt the user to enter one or more attributes associated with the simulation. In addition, the simulation may rely, at least partially, on sensor data 165 to define boundary conditions for the simulation. In one embodiment, simulator 160 may perform a computational fluid dynamics simulation to determine airflow characteristics within the building. If the computing device 100 determines that a simulation should be run, then method 1100 proceeds to step 1116 where computing device 100 runs one or more simulations based on the sensor data 165. At step 1118, computing device 100 generates simulator data 230 associated with the one or more simulations performed at step 1116. For example, sensor data 165 may include information related to the temperature and velocity of airflow at different air vents in the building. Simulator 160 may be configured to receive the airflow information in sensor data 165 and perform a simulation based on a computational fluid dynamics analysis. The airflow information in sensor data 165 provides boundary conditions for the simulation. The results of the simulation may be stored in system memory 104 and transmitted to application 150 for display in a rendered digital image of the building. Method 1100 then proceeds to step 1120.

Returning now to step 1114, if computing device 100 determines that a simulation should not be run, then method 1100 proceeds to directly to step 1120 where computing device 100 generates a digital image based on the BIM 155, sensor data 165, and simulator data 230. In one embodiment, application 150 causes computing device 100 to render a 2D view of the 3D building model in BIM 155 via an ambient occlusion rendering technique. Application 150 may also cause computing device 100 to render a representation of the sensor data 165 or the simulator data 230 in the 2D view. The representations may be generated using a direct rendering technique, such as by outlining an object in the 3D building model or shading the surfaces of an object in the 3D building model with a particular colored hue, or a transient geometry technique, such as by adding geometry not included in the 3D building model to the 2D view (e.g., glyphs, a plurality of arrows, a HUD, or a simulated volume). At step 1122, computing device 100 causes the digital image to be displayed on display device 110.

In sum, the present application describes a system and method for displaying performance related data for a building in the context of a rendered view of a three-dimensional model of the building. The disclosed system includes a sensor network for collecting data related to the building and a computing device for generating a digital image that includes a representation of the performance related data. The building model may be rendered using an ambient occlusion rendering technique and the graphical representation of the performance related data may be rendered using a variety of methods, such as by changing the appearance of objects in the rendered image or by adding objects to the rendered image that are not included in the building model.

One advantage of the disclosed approach is that a user may visualize the performance related data within the context of the structure of the building. Conventionally, performance related data for a building is represented as raw data and commonly displayed through charts or graphs. By adding graphical representations of the performance related data to a rendered image of the 3D model, a user may interpret the data with a greater understanding of the interrelated spatial and contextual configuration of the building. Such advancements may promote more efficient buildings to be designed and built in the future, which has positive environmental impacts and may reduce the operating costs of a building.

While the foregoing is directed to embodiments of the present invention, other and further embodiments of the present invention may be devised without departing from the basic scope thereof. For example, aspects of the present invention may be implemented in hardware or software or in a combination of hardware and software. One embodiment of the present invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

What is claimed is:

1. A method for displaying a unified representation of performance related data for a building, the method comprising:
  receiving a building information model (BIM) that includes three-dimensional (3D) geometry data and metadata related to the building;
  receiving sensor data that includes one or more values associated with the performance related data;
  rendering a digital image that includes a representation of the 3D geometry data and a representation of the sensor data by integrating a result data set of a computational simulation into the 3D geometry data, the simulation made using the received sensor data, wherein rendering the digital image further comprises outlining silhouettes of one or more objects included in the BIM, wherein the silhouettes are outlined based on the one or more values of the sensor data; and
  causing the digital image to be displayed on a display device.

2. The method of claim 1, wherein rendering the digital image further comprises:
  generating pixel data based on the 3D geometry data integrated with the result data set of the computational simulation, using an ambient occlusion rendering technique, wherein a color value for at least one pixel in the generated pixel data is determined based on a result data value in the result data set.

3. The method of claim 1, wherein the result data set is integrated into the 3D geometry data using at least one of shading techniques and transient geometry techniques.

4. The method of claim 1, wherein the sensor data and the result data set comprise at least one of logical data, scalar data, vector data, or semantic data.

5. The method of claim 1, wherein rendering the digital image further comprises at least one of:
  shading surfaces associated with one or more objects included in the BIM with a colored hue; or
  shading each point on surfaces of one or more objects included in the BIM with a particular color that is based on a portion of the sensor data or a portion of the result data set related to the point.

6. The method of claim 1, wherein rendering the digital image further comprises at least one of:
  rendering a 3D glyph object in the digital image;
  rendering a plurality of 3D arrow objects in the digital image based on sensor data that includes a vector field;
  overlaying a graphical representation of a heads-up-display (HUD) over the digital image; or
  rendering a plume object in the digital image.

7. The method of claim 1, wherein the building information model conforms to a National Building Information Model Standard (NBIMS).

8. The method of claim 1, wherein the sensor data indicates whether an object is occupied or unoccupied.

9. The method of claim 1, wherein rendering the digital image further comprises rendering a 3D glyph object in the digital image.

10. A non-transitory computer-readable medium containing a program which, when executed, performs an operation for displaying a unified representation of performance related data for a building, the operation comprising:
  receiving a building information model (BIM) that includes three-dimensional (3D) geometry data and metadata related to the building;
  receiving sensor data that includes one or more values associated with the performance related data;
  rendering a digital image that includes a representation of the 3D geometry data and a representation of the sensor data by integrating a result data set of a computational simulation into the 3D geometry data, the simulation made using the received sensor data, wherein rendering the digital image further comprises outlining silhouettes of one or more objects included in the BIM, wherein the silhouettes are outlined based on the one or more values of the sensor data; and
  causing the digital image to be displayed on a display device.

11. The non-transitory computer-readable medium of claim 10, wherein rendering the digital image further comprises:
  generating pixel data based on the 3D geometry data integrated with the result data set of the computational simulation, using an ambient occlusion rendering technique, wherein a color value for at least one pixel in the generated pixel data is determined based on a result data value in the result data set.

12. The non-transitory computer-readable medium of claim 10, wherein the result data set is integrated into the 3D geometry data using at least one of shading techniques and transient geometry techniques.

13. The non-transitory computer-readable medium of claim 10, wherein the sensor data and the result data set comprise at least one of logical data, scalar data, vector data, or semantic data.

14. The non-transitory computer-readable medium of claim 10, wherein rendering the digital further comprises at least one of:
- shading surfaces associated with one or more objects included in the BIM with a colored hue; or
- shading each point on surfaces of one or more objects included in the BIM with a particular color that is based on a portion of the sensor data or a portion of the result data set related to the point.

15. The non-transitory computer-readable medium of claim 10, wherein rendering the digital image further comprises at least one of:
- rendering a 3D glyph object in the digital image;
- rendering a plurality of 3D arrow objects in the digital image based on sensor data that includes a vector field;
- overlaying a graphical representation of a heads-up-display (HUD) over the digital image; or
- rendering a plume object in the digital image.

16. The non-transitory computer-readable medium of claim 10, wherein the building information model conforms to a National Building Information Model Standard (NBIMS).

17. A system for displaying a unified representation of performance related data for a building, the system comprising:
- a sensor network configured to collect sensor data in the building that includes one or more values associated with the performance related data; and
- a computing device configured to:
  - receive building information model (BIM) that includes three-dimensional (3D) geometry data and metadata related to the building;
  - receive sensor data that includes one or more values associated with the performance related data;
  - render a digital image that includes a representation of the 3D geometry data and a representation of the sensor data by integrating a result data set of a computational simulation into the 3D geometry data, the simulation made using the received sensor data, wherein rendering the digital image further comprises outlining silhouettes of one or more objects included in the BIM, wherein the silhouettes are outlined based on the one or more values of the sensor data; and
  - cause the digital image to be displayed on a display device.

18. The system of claim 17, wherein rendering the digital image further comprises:
- generating pixel data based on the 3D geometry data integrated with the result data set of the computational simulation, using an ambient occlusion rendering technique, wherein a color value for at least one pixel in the generated pixel data is determined based on a result data value in the result data set.

19. The system of claim 17, the computing device further configured to:
- integrate the result data set into the 3D geometry data using at least one of shading techniques and transient geometry techniques.

20. The system of claim 17, wherein the sensor data and the result data set comprise at least one of logical data, scalar data, vector data, or semantic data.

21. The system of claim 17, wherein rendering the digital image further comprises at least one of:
- shading surfaces associated with one or more objects included in the BIM with a colored hue; or
- shading each point on surfaces of one or more objects included in the BIM with a particular color that is based on a portion of the sensor data or a portion of the result data set related to the point.

22. The system of claim 17, wherein rendering the digital image further comprises at least one of:
- rendering a 3D glyph object in the digital image;
- rendering a plurality of 3D arrow objects in the digital image based on sensor data that includes a vector field;
- overlaying a graphical representation of a heads-up-display (HUD) over the digital image; or
- rendering a plume object in the digital image.

* * * * *